US012603471B2

(12) United States Patent
Runcorn

(10) Patent No.: US 12,603,471 B2
(45) Date of Patent: Apr. 14, 2026

(54) APPARATUS AND METHOD FOR ADJUSTING THE WAVELENGTH OF LIGHT

(71) Applicant: IMPERIAL COLLEGE INNOVATIONS LIMITED, London (GB)

(72) Inventor: Timothy Runcorn, London (GB)

(73) Assignee: Imperial College Innovations Limited, London (GB)

( * ) Notice: Subject to any disclaimer, the term of this patent is extended or adjusted under 35 U.S.C. 154(b) by 882 days.

(21) Appl. No.: 17/911,774

(22) PCT Filed: Mar. 18, 2021

(86) PCT No.: PCT/GB2021/050672
§ 371 (c)(1),
(2) Date: Sep. 15, 2022

(87) PCT Pub. No.: WO2021/186178
PCT Pub. Date: Sep. 23, 2021

(65) Prior Publication Data
US 2023/0124281 A1 Apr. 20, 2023

(30) Foreign Application Priority Data
Mar. 19, 2020 (GB) ...................................... 2004023

(51) Int. Cl.
*H01S 3/30* (2006.01)
*H01S 3/00* (2006.01)
(Continued)

(52) U.S. Cl.
CPC ............ *H01S 3/302* (2013.01); *H01S 3/0057* (2013.01); *H01S 3/0941* (2013.01);
(Continued)

(58) Field of Classification Search
CPC ............. H01S 3/10084; H01S 3/10092; H01S 3/2316; H01S 3/302
See application file for complete search history.

(56) References Cited

U.S. PATENT DOCUMENTS

| | | | |
|---|---|---|---|
| 6,567,605 B1 | 5/2003 | Rice et al. | |
| 2003/0021302 A1* | 1/2003 | Grudinin ................. H01S 3/302 | |
| | | | 372/6 |

(Continued)

FOREIGN PATENT DOCUMENTS

| | | |
|---|---|---|
| JP | 2016-180844 | 10/2016 |
| WO | 2011/133698 | 10/2011 |

(Continued)

OTHER PUBLICATIONS

Rowen et al., "A combined Yb-Raman fiber amplifier for generating narrow linewidth, high-power pulses in the 1100-1200 nm wavelength range and efficient nonlinear conversion into Yellow," Proceedings of SPIE, vol. 8601 (Feb. 22, 2013).
(Continued)

*Primary Examiner* — Michael Carter
(74) *Attorney, Agent, or Firm* — Barnes & Thornburg

(57) ABSTRACT
An optical arrangement for adjusting the wavelength of light, comprising: a first light source arranged to generate a first beam of light at a first wavelength; a second light source arranged to generate seed light at a second wavelength; a first Raman shifting medium arranged to receive the light from the first light source in combination with the seed light from the second light source, and to produce, by stimulated Raman scattering, output light at the second wavelength and having temporal properties determined by those of the first beam of light; a third light source arranged to generate seed light at a third wavelength; and a second Raman shifting medium arranged to receive the output light from the first Raman shifting medium in combination with the seed light
(Continued)

from the third light source, and to produce, by stimulated Raman scattering, output light at the third wavelength and having temporal properties determined by those of the output light from the first Raman shifting medium; wherein the third wavelength is greater than the second wavelength, and the second wavelength is greater than the first wavelength; wherein the frequency difference between the first beam of light and the seed light from the second light source is a frequency difference where the first Raman shifting medium exhibits Raman gain; and wherein the frequency difference between the output light from the first Raman shifting medium and the seed light from the third light source is a frequency difference where the second Raman shifting medium exhibits Raman gain. Also provided is a corresponding method of adjusting the wavelength of light.

19 Claims, 4 Drawing Sheets

(51) Int. Cl.

| | | |
|---|---|---|
| *H01S 3/0941* | (2006.01) | |
| *H01S 3/10* | (2006.01) | |
| *H01S 3/16* | (2006.01) | |
| *H01S 3/23* | (2006.01) | |

(52) U.S. Cl.
CPC ...... *H01S 3/10084* (2013.01); *H01S 3/10092* (2013.01); *H01S 3/1603* (2013.01); *H01S 3/2316* (2013.01)

(56) References Cited

U.S. PATENT DOCUMENTS

| | | | |
|---|---|---|---|
| 2014/0254614 A1* | 9/2014 | Nicholson ........... | H04J 14/0307 |
| | | | 372/3 |
| 2015/0222085 A1 | 8/2015 | Keaton et al. | |
| 2016/0118765 A1 | 4/2016 | Huber et al. | |
| 2017/0179673 A1* | 6/2017 | Wielandy .................. | H01S 3/13 |

FOREIGN PATENT DOCUMENTS

| | | |
|---|---|---|
| WO | 2012/003391 | 1/2012 |
| WO | 2016/044395 | 3/2016 |

OTHER PUBLICATIONS

Search & Examination Report issued in Appl. No. GB2004023.4 (2020).
Search Report & Written Opinion issued in Appl. No. PCT/GB2021/050672 (2021).

* cited by examiner

APPARATUS AND METHOD FOR ADJUSTING THE WAVELENGTH OF LIGHT

CROSS-REFERENCE TO RELATED APPLICATIONS

This application is a US National Phase Application Under Section 371 of PCT Application No. PCT/GB2021/050672, filed on Mar. 18, 2021, which claims priority from United Kingdom Application No. GB 2004023.4, filed on Mar. 19, 2020, the entirety of which are each fully incorporated by reference herein.

FIELD OF THE INVENTION

This invention relates to an optical arrangement and associated method for adjusting the wavelength of light. It is particularly applicable to lasers, and may be used to produce laser light at a wavelength that cannot naturally be generated by a conventional laser source, for example for use in imaging applications such as super-resolution microscopy, photoacoustic imaging and flow cytometry. Other application areas are also possible, such as fibre-optic communications and display/projection devices.

BACKGROUND TO THE INVENTION

An obstacle to the development of certain practical applications of lasers—for example in the fields of imaging, telecommunications, and display devices—is that the specific wavelengths of laser light that are able to be produced naturally by a laser are limited by the electronic or molecular transitions available in the gain medium employed.

For example, producing laser light in the 1220-1390 nm region is of particular interest as it would enable wavelengths in the red spectral region of 610-695 nm to be achieved through the use of known frequency-doubling techniques.

However, there are currently no lasers available in the 1220-1390 nm wavelength region with microjoule-level pulse energy, picosecond to nanosecond pulse duration and megahertz pulse repetition rates, i.e. corresponding to Watts of average power. (1 µJ of pulse energy at 1 MHz pulse repetition rate corresponds to 1 W of average power; average power=pulse energy×pulse repetition rate.) Existing laser technologies, such as semiconductor laser diodes and diode-pumped solid-state lasers, can only achieve combinations of two out of these three parameters—namely pulse energy, pulse duration and repetition rate. (For instance, some existing manufacturers of diode-pumped solid-state lasers offer Q-switched pulsed lasers at 660 nm and 671 nm but this laser technology is limited to pulse repetition rates around 100 kHz, which is not high enough for many imaging applications.) For imaging applications such as super-resolution microscopy, photoacoustic imaging and flow cytometry, laser sources in the red spectral region with all three of these parameters are required to image molecules that are of interest but cannot currently be imaged.

Moreover, for a number of applications, there is also a desire that the laser pulses be of narrow frequency bandwidth (<100 GHz linewidth). Narrow frequency bandwidth pulses are beneficial for a wide range of nonlinear optical processes and optical spectroscopy, whilst megahertz pulse repetition rates are necessary for a variety of imaging and display/projection applications. There are currently no laser sources operating in the 1220-1390 nm wavelength region that emit pulses with a high pulse energy at megahertz pulse repetition rates with a sufficiently narrow frequency bandwidth to render them suitable for such applications.

WO 2016/044395 A1 discloses a technique for adjusting the wavelength of laser light using stimulated Raman scattering (SRS), wherein multiple Raman shifts take place in a single optical fibre. However, the technique disclosed therein is not capable of generating light with a suitably narrow frequency bandwidth for application areas in which a narrow frequency bandwidth is desired. For instance, WO 2016/044395 A1 discloses the generation of 1220-1300 nm light with a bandwidth of at least 10 nm, which corresponds to a frequency bandwidth of at least 1800 GHz, which is considerably greater than the abovementioned desired value of <100 GHz.

More generally, existing fibre-based sources (e.g. as disclosed in WO 2016/044395 A1) cannot generate sufficiently narrow frequency bandwidth pulses, whilst diode-pumped solid-state laser-based sources cannot operate at sufficiently high pulse repetition rates.

The present invention sets out to address such shortcomings in the prior art.

SUMMARY OF THE INVENTION

According to a first aspect of the present invention there is provided an optical arrangement as defined in claim 1 of the appended claims. Thus there is provided an optical arrangement for adjusting the wavelength of light, comprising:

a first light source arranged to generate a first beam of light at a first wavelength;

a second light source arranged to generate seed light at a second wavelength;

a first Raman shifting medium arranged to receive the light from the first light source in combination with the seed light from the second light source, and to produce, by stimulated Raman scattering, output light at the second wavelength and having temporal properties determined by those of the first beam of light;

a third light source arranged to generate seed light at a third wavelength; and a second Raman shifting medium arranged to receive the output light from the first Raman shifting medium in combination with the seed light from the third light source, and to produce, by stimulated Raman scattering, output light at the third wavelength and having temporal properties determined by those of the output light from the first Raman shifting medium;

wherein the third wavelength is greater than the second wavelength, and the second wavelength is greater than the first wavelength;

wherein the frequency difference between the first beam of light and the seed light from the second light source is a frequency difference where the first Raman shifting medium exhibits Raman gain; and wherein the frequency difference between the output light from the first Raman shifting medium and the seed light from the third light source is a frequency difference where the second Raman shifting medium exhibits Raman gain.

By providing the first Raman shifting medium specifically to shift the wavelength of the received light from the first wavelength to the second wavelength, and by providing the separate second Raman shifting medium specifically to shift the wavelength of the received light from the second wavelength to the third wavelength, this enables output light to be emitted from the second Raman shifting medium having a narrow frequency bandwidth, since only one Raman shift occurs in each Raman shifting medium. This also enables microjoule-level pulse energy, picosecond to nanosecond pulse duration and megahertz pulse repetition rates to be achieved in the output light. Moreover, producing output light from the second Raman shifting medium having a narrow frequency bandwidth enables that light to subsequently be frequency-doubled (if it is desired to do so) at high efficiency using a periodically poled (PP) nonlinear optical crystal.

Preferably the second Raman shifting medium has a different composition from the first Raman shifting medium, thereby enabling the first and second Raman shifting media to be tailored to the first and second Raman shifts they respectively perform.

Preferably the first light source comprises a laser, to produce intense light with both spatial coherence and temporal coherence, suitable for stimulated Raman scattering. However, it is possible that types of light source other than lasers may be suitable for this purpose, or may become available in the future, such as sufficiently powerful LEDs.

Preferably the first light source is arranged to operate in a pulsed manner, and thus the temporal properties of the first beam of light comprise the first beam of light being pulsed. Advantageously, this makes it easier to achieve the high intensities required to obtain good conversion from one wavelength to another by stimulated Raman scattering.

In certain embodiments the first light source may be arranged to pulse the first beam of light with a megahertz pulse repetition rate.

Either, or each, of the second and third light sources may also comprise a laser. Moreover, either, or each, of the second and third light sources may be arranged to operate in a continuous-wave (CW) manner, as CW light sources tend to be cheaper and less complex.

In certain embodiments the first Raman shifting medium comprises an optical fibre. However, in other embodiments, the first Raman shifting medium may comprise another medium, such as a suitable optical crystal, a suitable liquid, or a suitable gas.

In presently-preferred embodiments the optical fibre of the first Raman shifting medium is a rare-earth doped optical fibre. Particularly preferably the rare-earth doped optical fibre comprises ytterbium, erbium, thulium, neodymium or holmium doping; these elements can be doped in silica fibres, which have the best optical and mechanical properties. Thus the rare-earth doped optical fibre may be a silica fibre.

However, alternatively, the rare-earth doped optical fibre may comprise dysprosium, samarium or praseodymium doping, although these elements are generally less preferable since they can only be used in non-silica fibres, which have less good handling and performance characteristics than silica fibres.

In presently-preferred embodiments the optical arrangement further comprises an optical pump arranged to cause a population inversion of rare-earth ions within the rare-earth doped optical fibre (i.e. the first Raman shifting medium) and thereby cause amplification of the first beam of light by stimulated emission. Advantageously the optical pump may comprise a semiconductor laser diode, as these are cheap and readily available with high power. Moreover, the optical pump may be arranged to operate in a continuous-wave manner.

In presently-preferred embodiments the optical pump is arranged to generate light at a shorter wavelength than the first wavelength.

In presently-preferred embodiments the second Raman shifting medium comprises an optical fibre. Particularly preferably the optical fibre of the second Raman shifting medium is not rare-earth doped. For example, the optical fibre of the second Raman shifting medium may be a phosphosilicate fibre. However, in other embodiments, the second Raman shifting medium may comprise another medium, such as a suitable optical crystal, a suitable liquid, or a suitable gas.

The optical arrangement may further comprise a first wavelength division multiplexer arranged to combine the light from the first light source and the seed light from the second light source and to supply the combined light to the first Raman shifting medium; and/or a second wavelength division multiplexer arranged to combine the output light from the first Raman shifting medium and the seed light from the third light source and to supply the combined light to the second Raman shifting medium.

Desirably, the first wavelength may be in the range of 1010-1110 nm, the second wavelength may be in the range of 1050-1170 nm, and the third wavelength may be in the range of 1220-1390 nm.

Optionally the optical arrangement may further comprise a frequency-doubling optical subassembly arranged to receive the output light from the last of the Raman shifting media and to generate light at half the wavelength of the received light. For example, the output light from the last of the Raman shifting media may have a wavelength of approximately 1310 nm and thus the light generated by the frequency-doubling optical subassembly may have a wavelength of approximately 655 nm. This is a sought-after red wavelength that has significant potential application across a range of industries.

According to a second aspect of the invention there is provided an imaging device (e.g. a super-resolution microscope, a photoacoustic imaging device, or a flow cytometry device) comprising the optical arrangement according to the first aspect of the invention.

According to a third aspect of the invention there is provided a display or projection device comprising the optical arrangement according to the first aspect of the invention.

According to a fourth aspect of the invention there is provided a method of adjusting the wavelength of light, comprising:

generating, using a first light source, a first beam of light at a first wavelength;

generating, using a second light source, seed light at a second wavelength;

arranging a first Raman shifting medium to receive the light from the first light source in combination with the seed light from the second light source, and to produce, by stimulated Raman scattering, output light at the second wavelength and having temporal properties determined by those of the first beam of light;

generating, using a third light source, seed light at a third wavelength; and arranging a second Raman shifting medium to receive the output light from the first Raman shifting medium in combination with the seed light from the third light source, and to produce, by stimulated Raman scattering, output light at the third wavelength and having temporal properties determined by those of the output light from the first Raman shifting medium;

wherein the third wavelength is greater than the second wavelength, and the second wavelength is greater than the first wavelength;

wherein the frequency difference between the first light and the seed light from the second light source is a frequency difference where the first Raman shifting medium exhibits Raman gain; and wherein the frequency difference between the output light from the first Raman shifting medium and the seed light from the third light source is a frequency difference where the second Raman shifting medium exhibits Raman gain.

Further preferable or optional features in relation to the method correspond to the preferable or optional features outlined above in relation to the optical arrangement of the first aspect of the invention.

BRIEF DESCRIPTION OF THE DRAWINGS

Embodiments of the invention will now be described, by way of example only, and with reference to the drawings in which.

In the figures, like elements are indicated by like reference signs throughout.

DETAILED DESCRIPTION OF PREFERRED EMBODIMENTS

The present embodiments represent the best ways known to the Applicant of putting the invention into practice. However, they are not the only ways in which this can be achieved.

Embodiments of the invention provide a multiple (i.e. at least two) Raman shift architecture for adjusting the wavelength of input light, wherein a separate Raman shifting medium is provided for each Raman shift. This is in contrast to the configuration in WO 2016/044395 A1, in which multiple Raman shifts take place in a single optical fibre.

Figure 1:
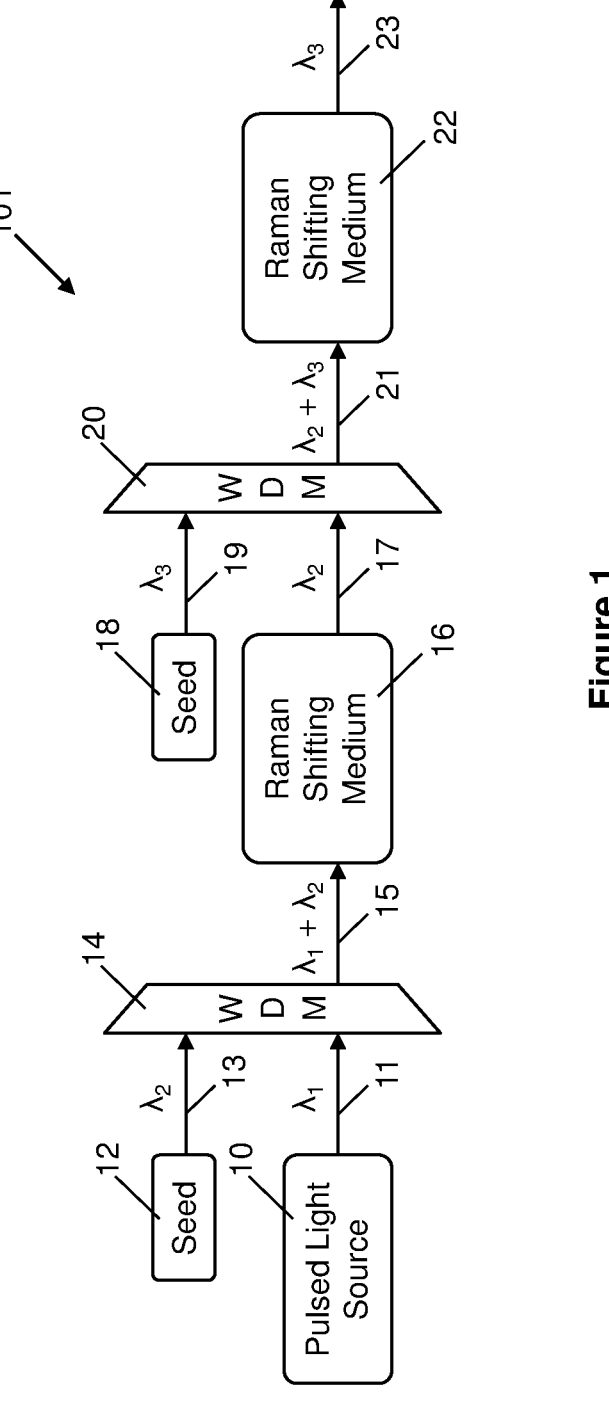
FIG. 1 is a schematic diagram of a multiple (i.e. at least two) Raman shift architecture, in accordance with embodiments of the present invention, wherein a separate Raman shifting medium is provided for each Raman shift.

With reference initially to FIG. 1, a first embodiment of the invention provides an optical arrangement 101 comprising a first light source 10 (e.g. a laser) arranged to generate a first beam of light 11 at a first wavelength $\lambda_1$, and a second light source 12 (e.g. a laser) arranged to generate seed light 13 at a second wavelength $\lambda_2$. The term "seed light" refers to the use of the light 13 as a "seed" for stimulated Raman scattering, as discussed in greater detail below.

Provided no optical components are incorporated within the optical arrangement 101 that alter the temporal properties of the light therein, the temporal properties of the first beam of light 11 will determine the temporal properties of the resulting output light 23. Indeed, the present disclosure primarily assumes that no components are present that alter the temporal properties of the light within the optical arrangement, although the principles of the present invention remain applicable even if such components are present. For reasons discussed in greater detail below, in presently-preferred embodiments the first light source 10 is configured to operate in a pulsed manner, so that the first beam of light 11 and the output light 23 are pulsed accordingly. For instance, as discussed below, the first light source 10 may beneficially be configured to generate pulsed light with a megahertz pulse repetition rate.

The optical arrangement 101 further comprises a first Raman shifting medium 16 arranged to receive the light 11 at wavelength $\lambda_1$ from the first light source 10 in combination with the seed light 13 at wavelength $\lambda_2$ from the second light source 12, as beam 15, and to produce, by stimulated Raman scattering, output light at the second wavelength $\lambda_2$ and having temporal properties (e.g. pulses) determined by those of the first beam of light 11. Examples of such a "Raman shifting medium" are given in detail below.

In the illustrated embodiment a first wavelength division multiplexer 14 is arranged to combine the light 11 at wavelength $\lambda_1$ from the first light source 10 and the seed light 13 at wavelength $\lambda_2$ from the second light source 12, to create beam 15 comprising wavelengths $\lambda_1$ and $\lambda_2$ in combination, and to supply the combined light to the first Raman shifting medium 16. In other variants, an alternative wavelength-combining component may be used in place of the first wavelength division multiplexer 14.

The optical arrangement 101 further comprises a third light source 18 arranged to generate seed light 19 at a third wavelength $\lambda_3$, and a second Raman shifting medium 22 arranged to receive the output light 17 at wavelength $\lambda_2$ from the first Raman shifting medium 16 in combination with the seed light 19 at wavelength $\lambda_3$ from the third light source 18, as beam 21, and to produce, by stimulated Raman scattering, output light 23 at the third wavelength $\lambda_3$ and having temporal properties (e.g. pulses) determined by those of the output light 17 from the first Raman shifting medium 16.

In the illustrated embodiment a second wavelength division multiplexer 20 is arranged to combine the light 17 at wavelength $\lambda_2$ from the first Raman shifting medium 16 and the seed light 19 at wavelength $\lambda_3$ from the third light source 18, to create a beam 21 comprising wavelengths $\lambda_2$ and $\lambda_3$ in combination, and to supply the combined light to the second Raman shifting medium 22. In other variants, an alternative wavelength-combining component may be used in place of the second wavelength division multiplexer 20.

The third wavelength $\lambda_3$ is greater than the second wavelength $\lambda_2$, and the second wavelength $\lambda_2$ is greater than the first wavelength $\lambda_1$.

As explained below, the frequency difference $(\Delta v)$ between the first beam of light 11 and the seed light 13 from the second light source 12 is a frequency difference where the first Raman shifting medium 16 exhibits Raman gain. Likewise, the frequency difference $(\Delta v)$ between the output light 17 from the first Raman shifting medium 16 and the seed light 19 from the third light source 18 is a frequency difference where the second Raman shifting medium 22 exhibits Raman gain.

Thus, by virtue of the two Raman shifts (produced by the first and second Raman shifting media 16, 22 respectively) the wavelength $\lambda_1$ of the first beam of light 11 generated by the first light source 10 is shifted to the wavelength $\lambda_3$ of the output light 23 from the second Raman shifting medium 22.

In the illustrated embodiment, the multiple Raman shift architecture contains two Raman shifting media, to provide two Raman shifts. However, in other embodiments, as discussed below, more than two Raman shifting media may be included, to provide a corresponding number of Raman shifts.

More particularly, the optical arrangement 101 of FIG. 1 provides a general example of a multiple (i.e. at least two) Raman shift architecture for generating output pulsed light 23 at a wavelength $\lambda_3$ with a narrow frequency bandwidth. The only constraints are that $\lambda_3 > \lambda_2 > \lambda_1$, and that the frequency difference $\Delta v$ between each of the two wavelengths that are supplied to a respective Raman shifting medium (e.g. $c/\lambda_1 - c/\lambda_2$, where c is the speed of light) is a frequency difference where the respective Raman shifting medium exhibits Raman gain (ideally, the maximum gain of the respective stimulated Raman scattering process). Each Raman shifting medium can be any molecular medium (solid, liquid or gas) that is transparent to the two wavelengths involved and has sufficient Raman gain such that efficient energy transfers occurs with light intensities that are practicable.

The frequency difference where any given Raman shifting medium exhibits Raman gain depends on the chemical composition of the Raman shifting medium. Accordingly, in the present embodiments, the separate Raman shifting media may advantageously have different compositions from one another, thereby enabling each Raman shifting medium to be tailored to the specific Raman shift it respectively performs.

Raman Shifting Media

The following are examples of Raman shifting media that may be used in embodiments of the present invention, but this list is by no means exhaustive:

Optical fibres: silica, phosphosilicate, germanosilicate, borosilicate, zirconium fluoride (ZBLAN), indium fluoride, tellurite, chalcogenide.

Optical crystals: barium nitrate, sodium nitrate, calcite, calcium tungstate, strontium tungstate, barium tungstate, sodium yttrium tungstate, potassium gadolinium tungstate, potassium yttrium tungstate, potassium ytterbium tungstate, lead tungstate, calcium molybdate, strontium molybdate, barium molybdate, lead molybdate, lithium iodate, lithium niobate, lanthanum niobate, lithium tantalate, gadolinium orthovanadate, yttrium orthovanadate, calcium orthovandate, calcium fluorophosphate, strontium fluorophosphate, diamond, fused silica.

Liquids: benzene, deuterated benzene, nitrobenzene, chlorobenzene, bromobenzene, toluene, pyridine, cyclohexane, 1-chloronaphthalene, 1-bromonaphthalene, ethyl alcohol, isopropyl alcohol, acetone, acetic acid, water, carbon disulphide, carbon tetrachloride, trichloromethane, Gases: hydrogen, deuterium, oxygen, nitrogen, helium, neon, argon, krypton, xenon.

Stimulated Raman Scattering (SRS)

As those skilled in the art will appreciate, stimulated Raman scattering (SRS) is a nonlinear optical process that can transfer energy from one wavelength to a second, longer, wavelength so long as the frequency difference between the two wavelengths corresponds to a vibrational resonance of the respective Raman shifting medium. If the first wavelength is sufficiently intense, almost quantum limited conversion (according to the ratio of the two wavelengths' photon energies) to the second wavelength can be achieved. The SRS process can start from noise—i.e. photons that are spontaneously Raman scattered at the second wavelength can be amplified to high enough intensity that significant power transfer occurs. However, as in the present invention, seeding each SRS process by providing photons of so-called seed light at the second (longer) wavelength (e.g. $\lambda_2$ in FIG. 1) reduces the required intensity of the first wavelength (e.g. $\lambda_1$ in FIG. 1) since the process is proportional to the product of the two intensities.

Seeding the SRS process also enables the light generated at the second wavelength to have a narrow frequency bandwidth in the respective Raman shifting media, such as glasses, where the Raman gain has a broad bandwidth.

With reference to the first Raman shifting medium 16 (although the principles apply equally to the second Raman shifting medium 22), the frequency properties of the light 17 outputted from the Raman shifting medium 16 at the second wavelength $\lambda_2$ are predominantly determined by the frequency properties of the seed light 13, whereas the temporal properties of the outputted light 17 are predominantly determined by the temporal properties of the light 11 of the first wavelength $\lambda_1$. Narrow frequency laser sources are cheaper and less complex if they operate continuous-wave (CW) rather than pulsed; therefore it is convenient (although not necessary) to use a CW laser as a seed light source.

The light 11 at the first wavelength $\lambda_1$ does not have to be pulsed, but using pulses makes it much easier to achieve the high intensities required to obtain good conversion. In optical fibres, there is an additional constraint that if the pulses are longer than around 10 ns in duration, they cannot have a narrow frequency bandwidth because a deleterious other nonlinear effect, namely stimulated Brillouin scattering, occurs at a lower intensity than the desired SRS process.

Figure 2:
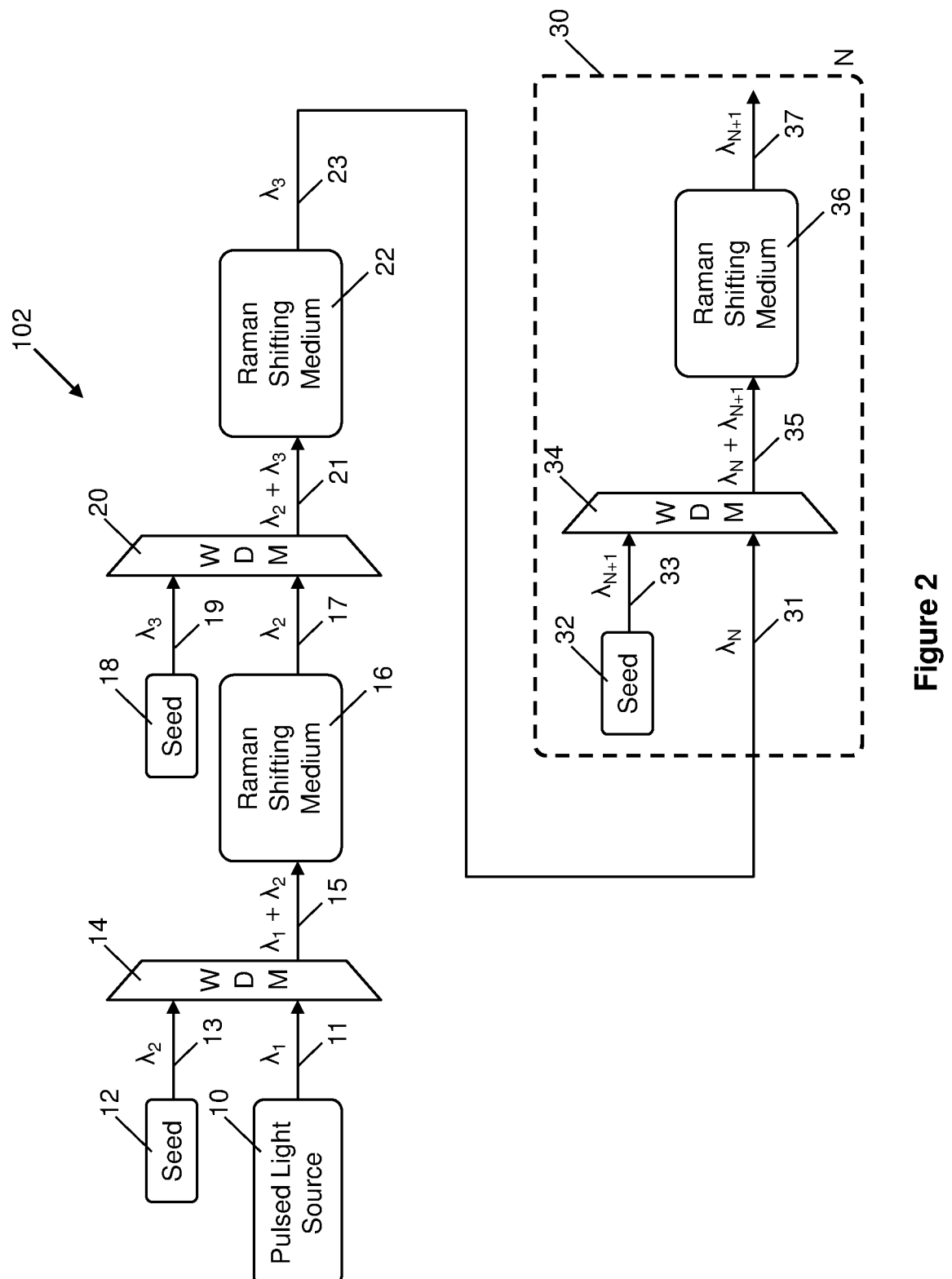
FIG. 2 is a development of the multiple Raman shift architecture of FIG. 1, extended to provide additional Raman shifts.

As illustrated in FIG. 2, the general principles of FIG. 1 can be extended to provide one or more additional Raman shifts. Thus, FIG. 2 shows an optical arrangement 102 having the same features as the optical arrangement 101 of FIG. 1, but also having a series of additional Raman shift units 30 (only one such unit is shown, but more are possible), each of which provides a respective additional Raman shift.

Thus, an additional Raman shift unit 30 provides an Nth seed light source 32 (where N is at least 3) arranged to generate seed light 33 at an (N+1)th wavelength $\lambda_{N+1}$, and an Nth Raman shifting medium 36 arranged to receive the output light 31 at wavelength $\lambda_N$ from the (N−1)th Raman shifting medium in combination with the seed light 33 at wavelength $\lambda_{N+1}$ from the Nth seed light source 32, as beam 35, and to produce, by stimulated Raman scattering, output light 37 at the (N+1)th wavelength $\lambda_{N+1}$ and again having temporal properties (e.g. pulses) determined by those of the first beam of light 11.

Within the additional Raman shift unit 30 an Nth wavelength division multiplexer 34 is arranged to combine the light 31 at wavelength $\lambda_N$ from the (N−1)th Raman shifting medium and the seed light 33 at wavelength $\lambda_{N+1}$ from the Nth seed light source 32, to create beam 35 comprising wavelengths $\lambda_N$ and $\lambda_{N+1}$ in combination, and to supply the combined light to the Nth Raman shifting medium 36. In other variants, an alternative wavelength-combining component may be used in place of the Nth wavelength division multiplexer 34.

Again the only constraints are that the (N+1)th wavelength $\lambda_{N+1}$ is greater than the Nth wavelength $\lambda_N$, the frequency difference between the Nth and (N+1)th wavelengths is a frequency difference where the Nth Raman shifting medium 36 exhibits Raman gain, and the Nth Raman shifting medium is transparent to both wavelengths.

The concept of introducing only one seed wavelength at each stage of Raman shifting, and providing a separate Raman shifting medium for each Raman shift, is highly counterintuitive. As the Raman shifting process can be cascaded, a more common approach would be to introduce one or more of the N+1 wavelengths and perform multiple Raman shifts in the same Raman shifting medium. However, the present inventor has found that, when using optical fibres as the Raman shifting medium, it is not possible to obtain a narrow frequency bandwidth at say $\lambda_3$, if the shift from $\lambda_1$ to $\lambda_2$ is performed in the same fibre. This is due to other nonlinear effects besides stimulated Raman scattering (SRS), such as four-wave mixing, occurring in the fibre. Counterintuitively, therefore, it is advantageous to introduce only one seed wavelength at each stage of Raman shifting, and to provide a separate Raman shifting medium for each Raman shift, in accordance with the present invention.

Separate Optical Fibres as the Raman Shifting Media

Figures 3, 4:
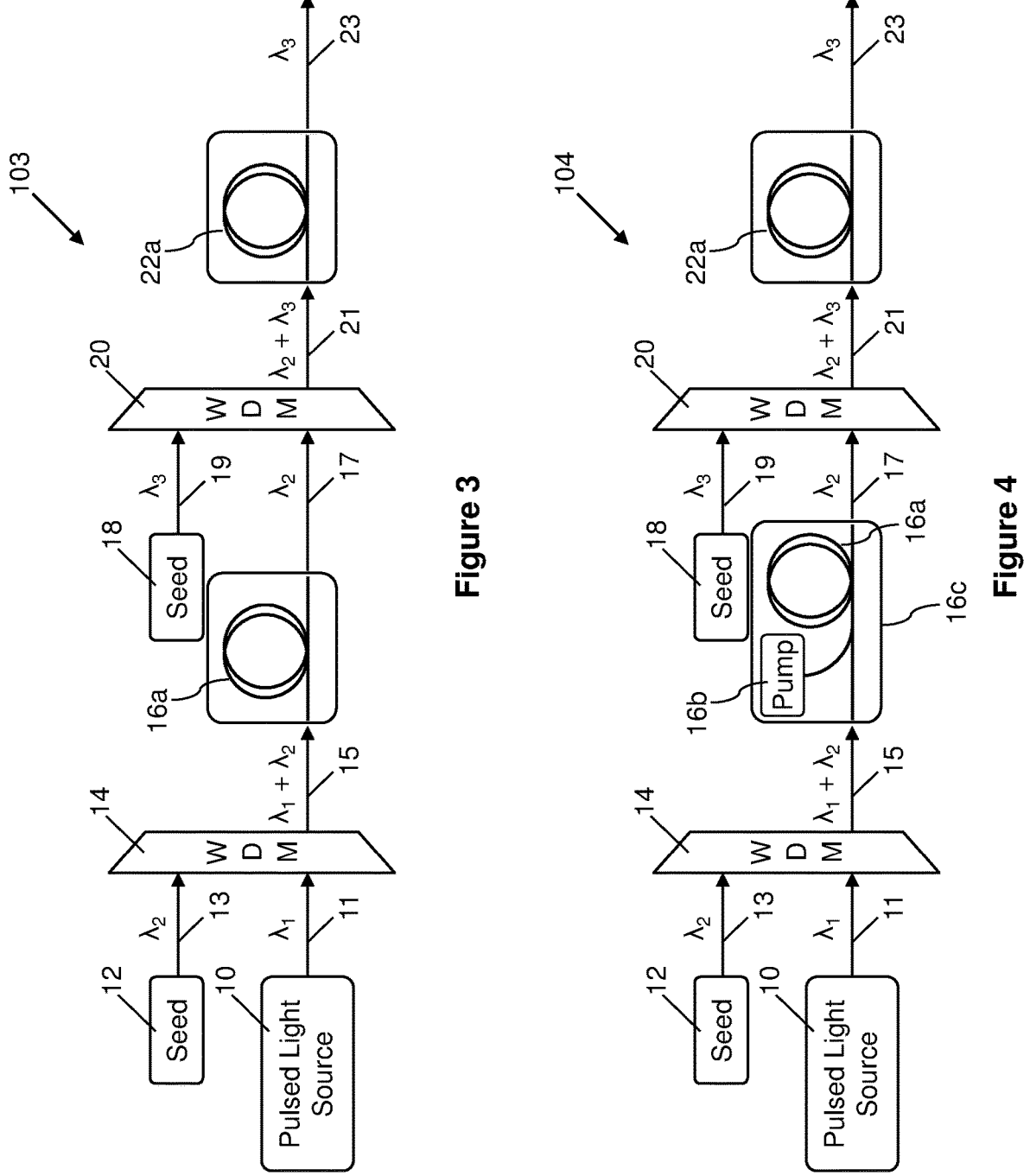
FIG. 3 is a development of the multiple Raman shift architecture of FIG. 1, having a separate optical fibre as each of the two Raman shifting media.
FIG. 4 is an implementation of the multiple Raman shift architecture of FIG. 3, wherein the first Raman shifting medium is a rare-earth doped optical fibre (also known as an active fibre) and the second Raman shifting medium is an optical fibre that is not rare-earth doped (also known as a passive fibre)

FIG. 3 shows an optical arrangement 103 having substantially the same structure as the optical arrangement 101 of FIG. 1, showing the use of a separate optical fibre 16a, 22a as each of the two different Raman shifting media (16, 22 in FIG. 1). The use of a separate optical fibre as each of the different Raman shifting media can be readily applied to additional shifts, as per FIG. 2.

Optical fibres represent a very attractive Raman shifting medium for two reasons. Firstly, their small core size where the light is guided (around 6 μm for single-mode fibres) means that very high optical intensities can be maintained over long (metres to kilometres) interaction lengths. This means that the peak-power (highest instantaneous power) of the pulses to achieve high stimulated Raman scattering (SRS) conversion efficiencies is relatively modest compared to using e.g. an optical crystal as the Raman shifting medium, where the interaction length is at most a few centimetres.

Secondly, optical fibres can be joined together (termed "fusion splicing") with negligible optical losses. Given that all the required optical components, e.g. the wavelength division multiplexers of the above-described systems, are available as fibre-coupled devices, this means that all the components and different fibres can be joined to form a monolithic system. This is a significant advantage when developing a laser device because it means there are no free-space laser beams, so the system never goes out of alignment and it is very robust against vibrations and shocks. It also means the laser can be very compact (since fibres can be coiled to small radii) and the cooling requirements are low (because the fibres have a large surface area to volume ratio).

Active and Passive Optical Fibres as Raman Shifting Media

FIG. 4 shows an implementation of an optical arrangement 104 having substantially the same structure as the optical arrangement 103 of FIG. 3. In the implementation of FIG. 4, the first Raman shifting medium is a rare-earth doped optical fibre 16a (also known as an active fibre) and the second Raman shifting medium is an optical fibre 22a that is not rare-earth doped (also known as a passive fibre).

In the implementation of FIG. 4, an optical pump 16b is provided to cause a population inversion of rare-earth ions within the rare-earth doped optical fibre 16a, i.e. optical pumping.

In this implementation, the first Raman shifting medium, namely the rare-earth doped optical fibre 16a, serves two purposes. Firstly, it amplifies the light (e.g. pulsed light) of wavelength $\lambda_1$ (as provided by light source 10) by the process of stimulated emission, that occurs due to the population inversion of the rare-earth ions created by the light from the pump 16b. The light from the pump 16b is continuous-wave (CW), is a shorter wavelength than $\lambda_1$ and may conveniently be provided by a suitable semiconductor laser diode (as semiconductor laser diodes are cheap and available with high power). However, the pump light could alternatively be provided by any type of laser that emits light at wavelengths that are absorbed by the particular rare-earth doped fibre 16a that is used. Alternative pump light sources other than lasers are in principle possible, or may become available in the future, such as an LED of sufficient brightness.

For the rare-earth doped optical fibre 16a, active fibres are commercially available with ytterbium, erbium, thulium, neodymium, holmium, dysprosium, samarium and praseodymium rare-earth doping. Of these, ytterbium, erbium, thulium, neodymium and holmium can be doped in silica fibres, which have the best optical and mechanical properties. Dysprosium, samarium and praseodymium doping can only be used in non-silica fibres, which are less robust, cannot be joined as easily to other fibres and have worse performance characteristics. Each rare-earth element can amplify different wavelengths; for the silica-compatible elements these are around 1 μm for ytterbium and neodymium, 1.55 μm for erbium, 2 μm for thulium and 2.1 μm for holmium. Ytterbium-doped fibres are by far the most common for high power lasers because they offer the best performance characteristics (e.g. efficiency) and also operate at the shortest wavelengths.

The second function of the rare-earth doped fibre 16a is to act as the first Raman shifting medium. A rare-earth doped fibre will have the same Raman gain properties as a non-rare-earth doped fibre, so long as there are no major differences in the chemical composition of the core, which is the case for e.g. ytterbium-doped silica fibres. Therefore, in this arrangement, the rare-earth doped fibre 16a first amplifies the pulses at $\lambda_1$ which then reach a high enough intensity to transfer energy to $\lambda_2$ by stimulated Raman scattering. If the length and core size of the rare-earth doped fibre are chosen correctly, the SRS process is highly efficient and almost all of the energy (>95%) can be transferred to $\lambda_2$. For instance, an exemplary core size would be 6 μm and an exemplary fibre length for this core size would be around 6 m. Using this combined approach is preferable to amplifying the $\lambda_1$ pulses in a rare-earth doped fibre and then introducing $\lambda_2$ and performing the Raman shifting in a separate fibre because one can eliminate the losses from the wavelength division multiplexer (WDM). A caveat of this combined approach is that the rare-earth doped fibre 16a should not have significant absorption of the $\lambda_2$ wavelength.

By virtue of providing the first and second functions above, the rare-earth doped optical fibre 16a and the pump 16b may together be termed a "combined Raman amplifier" 16c.

With a view to eliminating loss, one might consider it more intuitive to also introduce $\lambda_3$ before the rare-earth doped fibre 16a, particularly if the second (passive) optical fibre 22a is of the same underlying composition as the rare-earth fibre 16a, e.g. silica. However, counterintuitively and in accordance with the present invention, the present inventor has found that it is advantageous to introduce $\lambda_3$ after the rare-earth doped fibre 16a, such that only one Raman shift occurs in each fibre, which as mentioned above is beneficial in order to achieve a narrow frequency bandwidth of the generated $\lambda_3$ light. An additional reason is that the WDM device 20 that introduces $\lambda_3$ can also be used to block certain wavelengths from entering the second (passive) optical fibre 22a. This would be beneficial when using silica fibres but is highly desirable if the second (passive) optical fibre 22a is phosphosilicate. This is because phosphosilicate fibres have Raman gain for both the silica frequency difference (around 13 THz) and the phosphorous frequency difference (around 40 THz) and therefore if light corresponding to the silica frequency difference is not blocked, one will not get good conversion to the phosphorous frequency difference.

A Presently-Preferred Embodiment

Initially still referring to FIG. 4, in a presently-preferred embodiment of the invention the rare-earth doped fibre 16a is an ytterbium-doped silica fibre, and thus the "combined Raman amplifier" 16c may be termed a "combined Yb-Raman amplifier". The second (passive) optical fibre 22a is phosphosilicate fibre. For this configuration, the $\lambda_1$ wavelength can be in the range 1010-1110 nm, the A2 wavelength can be in the range 1050-1170 nm, and the A3 wavelength can be in the range 1220-1390 nm. As indicated in the above paragraph, these wavelengths are constrained by the fact that the frequency difference between $\lambda_1$ and $\lambda_2$ has to be around 13 THz (the silica frequency difference) and the frequency difference between $\lambda_2$ and $\lambda_3$ has to be around 40 THz (the phosphorous frequency difference). An exemplary selection of wavelengths that correspond to the most readily available components would be $\lambda_1$=1064 nm, $\lambda_2$=1116 nm, and $\lambda_3$=1310 nm.

Figure 5:
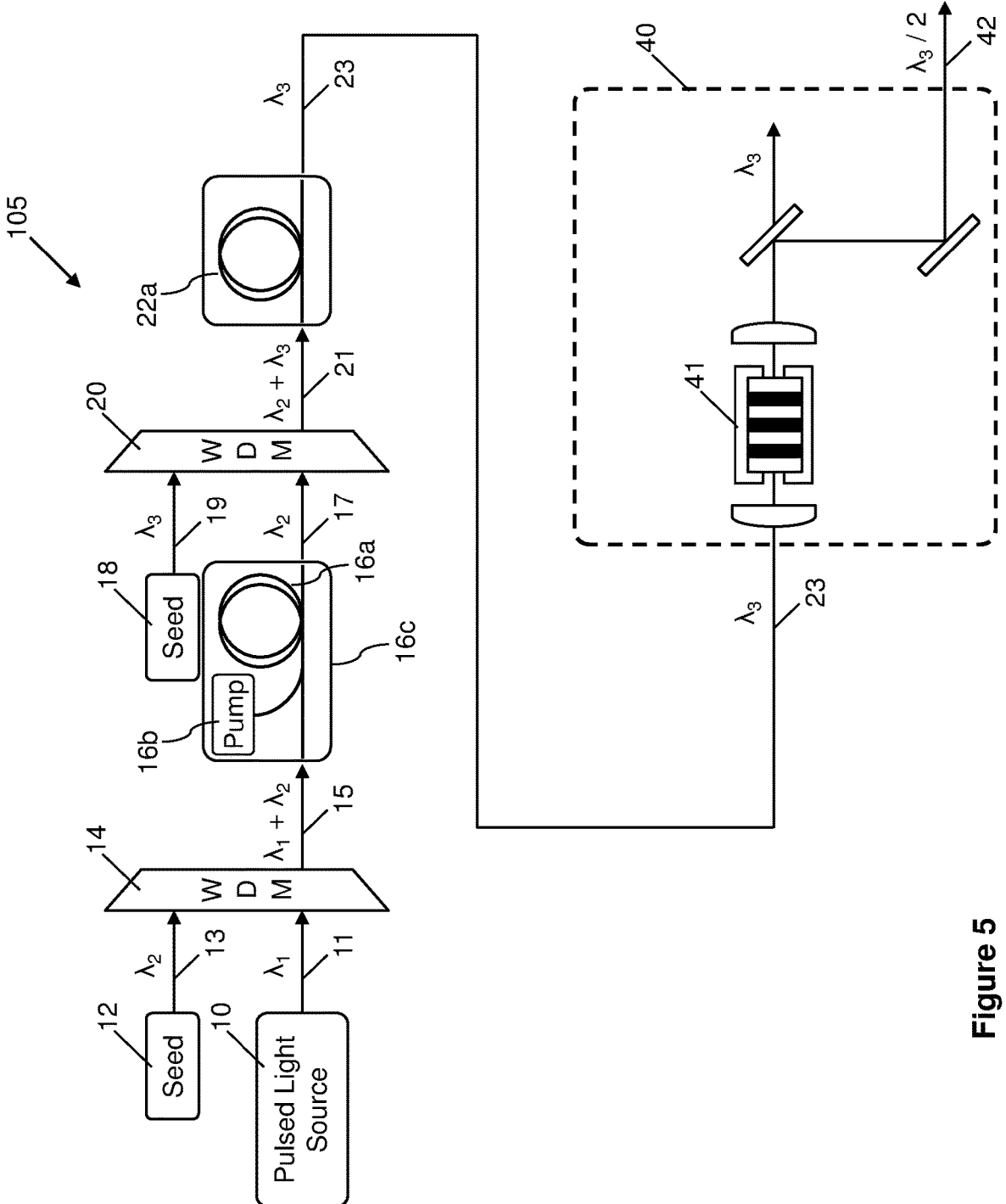
FIG. 5 is a development of the multiple Raman shift architecture of FIG. 4, wherein the output from the multiple Raman shifts is applied to a frequency-doubling optical subassembly comprising a periodically poled nonlinear optical crystal.

FIG. 5 illustrates a practical implementation of the presently-preferred embodiment, that may have particular use in imaging applications such as super-resolution microscopy, photoacoustic imaging and flow cytometry. The optical arrangement 105 has substantially the same structure as the optical arrangement 104 of FIG. 4, but also includes a frequency-doubling optical subassembly 40 comprising a periodically poled (PP) nonlinear optical crystal 41 to achieve a red (~655 nm) pulsed output 42.

In this implementation, a near-infrared (NIR) pulsed optical source 10 emits, as the first beam of light 11, a train of short (<10 ns in duration) pulses at a repetition rate between 1-200 MHz, at a wavelength $\lambda_1$ of around 1064 nm. This train of pulses is pre-amplified by an ytterbium-doped fibre amplifier (YDFA) to a power level suitable for amplification in the combined Yb-Raman amplifier 16c.

A seed signal 13 from a continuous-wave (CW) NIR optical source 12 operating at a frequency that is ~13 THz lower than the light of the pulsed optical source 10 is combined with the output of the YDFA using a first wavelength division multiplexer (WDM) 14, to form output beam 15. For a pulsed optical source 10 operating at a wavelength $\lambda_1$ of 1064 nm, the CW optical source 12 operates at a wavelength $\lambda_2$ of 1116 nm, 13 THz lower in frequency.

The output of the first WDM 14 is input into the combined Yb-Raman amplifier 16c, where the pulsed optical signal around 1064 nm is amplified by stimulated emission of the ytterbium (Yb) ions in the doped core of the fibre 16a, pumped by the optical pump 16b. The length and mode-field diameter of the fibre 16a in the combined Yb-Raman amplifier 16c are chosen such that, at a suitable pump power, optical power is transferred to the wavelength $\lambda_2$ of the CW optical source 12 via the nonlinear process of stimulated Raman scattering (SRS). For instance, as noted above, an exemplary core size would be 6 μm and an exemplary fibre length for this core size would be around 6 m. The wavelength $\lambda_2$ of the CW optical source 12 is not amplified by stimulated emission of the ytterbium ions. The SRS process is highly efficient, such that at the output of the combined Yb-Raman amplifier 16c, almost all (>95%) of the energy can be transferred to the wavelength $\lambda_2$ of the CW optical source 12 if the amplifier is designed correctly. The SRS process only transfers energy where the optical pulses around 1064 nm have high instantaneous optical power, and so the light 17 at the wavelength $\lambda_2$ of the CW optical source 12 at the output of the combined Yb-Raman amplifier 16c is a train of pulses at the same repetition rate as the pulsed optical source 10 with a similar but slightly shorter pulse duration.

The output light 17 from the combined Yb-Raman amplifier 16c is combined with a seed signal 19 from a second CW optical source 18 using a second WDM 20. The frequency of the second CW optical source 18 is ~40 THz lower than the first CW optical source 12, which corresponds to a wavelength $\lambda_3$ of 1310 nm (based on the wavelength $\lambda_2$ of the first CW optical source 12 being 1116 nm). The transmission spectrum of the second WDM 20 is designed to attenuate unconverted 1064 nm light and higher-order SRS light around 1180 nm from the output of the combined Yb-Raman amplifier 16c.

The output of the second WDM 20 is fusion spliced to a phosphosilicate optical fibre 22a. The length and mode-field diameter of the phosphosilicate optical fibre 22a is chosen so that energy is transferred via SRS from the wavelength $\lambda_2$ of the first CW optical source 12 to the wavelength $\lambda_3$ of the second CW optical source 18 with efficiencies exceeding 70%. The light 23 thus generated, at the wavelength $\lambda_3$ of the second CW optical source 18, is a pulse train with the same repetition rate as the output light 17 from the combined Yb-Raman amplifier 16c (which in turn, in the absence of any components that alter the temporal properties of the light within the optical arrangement 105, is determined by the repetition rate of the pulsed optical source 10) and a pulse duration similar but slightly shorter than the light 17 generated at the wavelength $\lambda_2$ of the first CW optical source 12 at the output of the combined Yb-Raman amplifier 16c.

To perform frequency-doubling and thereby achieve a red (~655 nm) pulsed output 42, the light 23 generated at the wavelength $\lambda_3$ of the second CW optical source 18 at the output of the phosphosilicate optical fibre 22a is focused into a periodically poled (PP) nonlinear optical crystal 41, which forms part of a frequency-doubling optical subassembly 40. The PP crystal 41 may comprise, for example, lithium niobate, lithium tantalate or potassium titanyl phosphate (so-called "KTP"). The PP crystal 41 is poled with a period to quasi phase-match second-harmonic generation (SHG) of light around 1310 nm to frequency-double it (i.e. halve the wavelength), to produce an ultimate output beam 42 having a wavelength of ~655 nm, in the red region of the visible spectrum. The frequency bandwidth of the second CW optical source 18 is chosen such that the light generated in the phosphosilicate optical fibre 22a has a frequency bandwidth that is significantly smaller than the spectral acceptance bandwidth of the PP crystal 41. This enables SHG conversion efficiencies of up to 80% to be achieved.

It should be noted that, to perform frequency-doubling efficiently, the PP crystal 41 requires a narrow frequency bandwidth of input light; and having a suitably narrow frequency bandwidth is a characteristic of the light that is output from the multiple Raman shift architecture of the present embodiments. It should therefore be appreciated that an important synergistical advantage arises from the use of a multiple Raman shift architecture in accordance with the present invention, together with a frequency-doubling PP crystal.

In other implementations the wavelength $\lambda_3$ of the light 23 may already be at the desired wavelength for its ultimate use, in which case frequency-doubling would naturally not be required. Accordingly the frequency-doubling optical subassembly 40 should be viewed as an optional part of the overall optical arrangement 105. Alternatively, the light 23 at wavelength $\lambda_3$ may be processed in other ways, instead of frequency-doubling.

SUMMARY

Thus, the present disclosure provides, inter alia, an optical arrangement for adjusting the wavelength of light, in which a first light source 10 in the near-infrared (NIR) emits a train of short (<10 ns in duration) pulses at a first wavelength $\lambda_1$. This pulse train is amplified by an optical fibre 16a, doped with the rare-earth element ytterbium (Yb), by a process of stimulated emission (using an optical pump 16b, thus forming a combined Yb-Raman fibre amplifier 16c). The intensity of the amplified pulse in the Yb-doped fibre 16a is high enough that energy is transferred by the nonlinear optical process of stimulated Raman scattering (SRS) to a second (longer) wavelength $\lambda_2$. To decrease the intensity threshold of the SRS process, the Yb-doped fibre 16a is seeded by a second NIR light source 12 operating at the second wavelength $\lambda_2$ that is not pulsed; it operates continuous wave (CW). The wavelength $\lambda_2$ of the light 13 emitted by the second light source 12 is longer than the wavelength $\lambda_1$ of the light 11 emitted by the first light source 10, and the frequency difference between the two is chosen to correspond to the maximum gain of the SRS process, which depends on the chemical composition of the optical fibre 16a. Provided the length of the Yb-doped fibre 16a and the diameter of the fibre core is chosen correctly, the SRS process is highly efficient, such that at the output of the Yb-doped fibre 16a, almost all (>95%) of the energy has been transferred to the longer second wavelength $\lambda_2$. The SRS process only transfers energy when there is high instantaneous optical power and so the light 17 generated at the longer wavelength $\lambda_2$ is a train of short pulses that have a duration similar but slightly shorter than the light 11 emitted by the first light source 10. Such a combined Yb-Raman fibre amplifier 16c is an effective method for generating pulse trains in the 1050-1170 nm wavelength range, which goes beyond the wavelength range that can be efficiently amplified by spontaneous emission in Yb-doped fibres (as Yb-doped fibres can only amplify up to 1110 nm efficiently).

In accordance with the presently-preferred embodiment of the present invention, a length of phosphosilicate optical fibre 22a is added to the output of the combined Yb-Raman fibre amplifier 16c, after a component (e.g. wavelength division multiplexer 20) that allows a signal 19 from a third NIR light source 18 at a third wavelength $\lambda_3$ (longer than the wavelength $\lambda_2$ of the light 13 emitted by the second light source 12) to be introduced. Phosphosilicate fibres have a maximum gain for the SRS process at a frequency difference that is approximately three times larger than standard silica optical fibres (40 THz compared to 13 THz). Thus, provided the length and core size of the phosphosilicate fibre 22a is chosen correctly, energy will be efficiently (exceeding 70%) transferred by SRS from the second wavelength $\lambda_2$ that is generated by the combined Yb-Raman fibre amplifier 16c to the longer third wavelength $\lambda_3$. As with the combined Yb-Raman fibre amplifier 16c, in the absence of any components that alter the temporal properties of the light within the optical arrangement, the light 23 that is generated at the third wavelength $\lambda_3$ will be a train of short pulses, even if the third NIR light source 18 is operated CW. Using the phosphosilicate optical fibre 22a, it is thus possible to efficiently generate pulse trains in the 1220-1390 nm wavelength range. These pulse trains can then be efficiently (up to 80%) converted into the red spectral region using the nonlinear optical process of second-harmonic generation (frequency-doubling) in an optical crystal 41, which generates output light 42 at half the input wavelength, i.e. 610-695 nm. Provided the frequency bandwidth of the third NIR light source 18 is chosen to be sufficiently small, the generated pulse train 23 in the 1220-1390 nm wavelength range will also have a small frequency bandwidth. This is advantageous for second-harmonic generation as it enables periodically poled nonlinear optical crystals 41 to be used, which achieve higher second-harmonic generation conversion efficiencies with lower instantaneous optical power than non-poled crystals.

Thus, following frequency-doubling, embodiments of the present invention are able to generate light at wavelengths greater than 610 nm, with high efficiency, and in a compact and cost-effective manner. Embodiments of the present invention are also scalable in pulse repetition rate, which correspondingly also means that they are scalable in average power, which increases the number of applications for which they can be used.

Concluding Remarks

In view of the above, and without prejudice to the overall scope of the present invention as set out in the appended claims, it will be appreciated an important contribution made by the present disclosure is the addition of a phosphosilicate optical fibre 22a to the output of a combined Yb-Raman fibre amplifier 16c with a wavelength combining component (e.g. wavelength division multiplexer 20) in-between. This ordering of the components, which we consider to be highly counterintuitive, enables light with a narrow frequency bandwidth to be generated since only one Raman shift occurs in each optical fibre. The simpler method of performing multiple Raman shifts in a single optical fibre, as disclosed in WO 2016/044395 A1, cannot generate light with such a narrow frequency bandwidth. A narrow frequency bandwidth is necessary to perform second-harmonic generation in a periodically poled crystal 41, which enables the overall optical arrangement to be cheaper and more compact than those using non-poled crystals, such as the one described in WO 2016/044395 A1.

Thus, compared to pre-existing technologies, embodiments of the present invention enable the generation of microjoule-level optical pulses in the 1220-1390 nm wavelength region at pulse repetition rates that can be scaled to hundreds of megahertz, corresponding to hundreds of Watts of average power. The present embodiments can generate pulses with a wide range of durations (>10 ps to <10 ns) at arbitrary pulse repetition rates with narrow frequency bandwidth. To the best of our knowledge there are currently no laser sources in this wavelength region that emit pulses with as high pulse energy at megahertz pulse repetition rates with such a narrow frequency bandwidth. Existing fibre-based sources (e.g. as disclosed in WO 2016/044395 A1) cannot generate such narrow frequency bandwidth pulses, whilst diode-pumped solid-state laser-based sources cannot operate at such high pulse repetition rates. Narrow frequency bandwidth pulses are beneficial for a wide range of nonlinear optical processes and optical spectroscopy, whilst megahertz pulse repetition rates are necessary for a variety of imaging and display/projection applications.

Exemplary Applications

A variety of practical applications are envisaged which incorporate optical arrangements as described above, embodying the present invention. Exemplary practical applications include imaging devices (e.g. super-resolution microscopes, photoacoustic imaging devices, or flow cytometry devices), display devices and projection devices that comprise such optical arrangements.

Modifications and Alternatives

Detailed embodiments and some possible alternatives have been described above. As those skilled in the art will appreciate, a number of modifications and further alternatives can be made to the above embodiments whilst still benefiting from the inventions embodied therein. It will therefore be understood that the invention is not limited to the described embodiments and encompasses modifications apparent to those skilled in the art lying within the scope of the claims appended hereto.

For example, in the above embodiments, the light sources are generally described as being lasers (with the term "laser" encompassing a range of different types of laser, including laser diodes). As those skilled in the art will appreciate, lasers are advantageous in generating coherent light. However, in other embodiments the light sources may be devices other than lasers.

Moreover, in the above embodiments, wavelength division multiplexers (e.g. 14 and 20) are used to combine beams of light at different wavelengths. However, in other embodiments, alternative wavelength-combining components may be used in place of the wavelength division multiplexers.

Finally, as explained above, the output light 17 from the first Raman shifting medium 16, at the second wavelength $\lambda_2$, has temporal properties determined by those of the first beam of light 11. Likewise, the output light 23 from the second Raman shifting medium 22, at the third wavelength $\lambda_3$, has temporal properties determined by those of the output light 17 from the first Raman shifting medium 16. Accordingly, as with the presently-described embodiments, provided no optical components are incorporated within the optical arrangement that alter the temporal properties of the light therein, the temporal properties of the first beam of light 11 will determine the temporal properties of the output light 23 from the second Raman shifting medium 22. However, in alternative embodiments, one or more optical elements could be used to alter the temporal properties (e.g. increase or decrease the pulse duration, or change the pulse repetition rate) of the light, either between the first light source 10 and the first Raman shifting medium 16, or between the first Raman shifting medium 16 and the second Raman shifting medium 22, or both. Nevertheless, even if such optical elements were to be present, and the temporal properties of the light were thereby altered within the optical arrangement, the principles of the present invention would still apply. In particular, it would remain the case that the output light 17 from the first Raman shifting medium 16, at the second wavelength $\lambda_2$, would have temporal properties determined—at least to some extent—by those of the first beam of light 11. Likewise, the output light 23 from the second Raman shifting medium 22, at the third wavelength $\lambda_3$, would have temporal properties determined—at least to some extent—by those of the output light 17 from the first Raman shifting medium 16. Thus, it should be appreciated that the term "determined" as used herein, in relation to the temporal properties of the light within the optical assembly, should be interpreted broadly, to encompass situations in which the temporal properties of the light are influenced to some extent by components within the optical assembly, as well as configurations in which no components are present that alter the temporal properties of the light.

The invention claimed is:

1. An optical arrangement for adjusting the wavelength of light, comprising:
   a first light source arranged to generate a first beam of light at a first wavelength;
   a second light source arranged to generate seed light at a second wavelength;
   a first Raman shifting medium arranged to receive the light from the first light source in combination with the seed light from the second light source, and to produce, by stimulated Raman scattering, output light at the second wavelength and having temporal properties determined by those of the first beam of light;
   a third light source arranged to generate seed light at a third wavelength; and
   a second Raman shifting medium arranged to receive the output light from the first Raman shifting medium in combination with the seed light from the third light source, and to produce, by stimulated Raman scattering, output light at the third wavelength and having temporal properties determined by those of the output light from the first Raman shifting medium;
   wherein the third wavelength is greater than the second wavelength, and the second wavelength is greater than the first wavelength;
   wherein the frequency difference between the first beam of light and the seed light from the second light source is a frequency difference where the first Raman shifting medium exhibits Raman gain;
   wherein the frequency difference between the output light from the first Raman shifting medium and the seed light from the third light source is a frequency difference where the second Raman shifting medium exhibits Raman gain; and
   wherein the second Raman shifting medium has a different composition from the first Raman shifting medium.

2. The optical arrangement according to claim 1, wherein the first light source comprises a laser;
   and/or wherein the second light source comprises a laser;
   and/or wherein the third light source comprises a laser.

3. The optical arrangement according to claim 1, wherein the first light source is arranged to operate in a pulsed manner, and thus the temporal properties of the first beam of light comprise the first beam of light being pulsed;
   wherein the first light source is arranged to pulse the first beam of light with a megahertz pulse repetition rate.

4. The optical arrangement according to claim 1, wherein the second light source is arranged to operate in a continuous-wave manner, and/or
   wherein the third light source is arranged to operate in a continuous-wave manner.

5. The optical arrangement according to claim 1, wherein the first Raman shifting medium comprises an optical fiber.

6. The optical arrangement according to claim 5, wherein the optical fiber of the first Raman shifting medium is a rare-earth doped optical fiber.

7. The optical arrangement according to claim 6, wherein the rare-earth doped optical fiber comprises ytterbium, erbium, thulium, neodymium or holmium doping;
   wherein the rare-earth doped optical fiber is a silica fiber.

8. The optical arrangement according to claim 6, wherein the rare-earth doped optical fiber comprises dysprosium, samarium or praseodymium doping.

9. The optical arrangement according to claim 6, further comprising an optical pump arranged to cause a population inversion of rare-earth ions within the rare-earth doped optical fiber, and thereby cause amplification of the first beam of light by stimulated emission;

wherein the optical pump comprises a semiconductor laser diode.

10. The optical arrangement according to claim 9, wherein the optical pump is arranged to operate in a continuous-wave manner.

11. The optical arrangement according to claim 9, wherein the optical pump is arranged to generate light at a shorter wavelength than the first wavelength.

12. The optical arrangement according to claim 1, wherein the second Raman shifting medium comprises an optical fiber.

13. The optical arrangement according to claim 12, wherein the optical fiber of the second Raman shifting medium is not rare-earth doped;

wherein the optical fiber of the second Raman shifting medium is a phosphosilicate fiber.

14. The optical arrangement according to claim 1, further comprising a first wavelength division multiplexer arranged to combine the light from the first light source and the seed light from the second light source and to supply the combined light to the first Raman shifting medium; and/or a second wavelength division multiplexer arranged to combine the output light from the first Raman shifting medium and the seed light from the third light source and to supply the combined light to the second Raman shifting medium.

15. The optical arrangement according to claim 1, wherein the first wavelength is in the range of 1010-1110 nm, the second wavelength is in the range of 1050-1170 nm, and the third wavelength is in the range of 1220-1390 nm.

16. The optical arrangement according to claim 1, further comprising a frequency-doubling optical subassembly arranged to receive the output light from the last of the Raman shifting media and to generate light at half the wavelength of the received light;

wherein the first wavelength is in the range of 1010-1110 nm, the second wavelength is in the range of 1050-1170 nm, and the third wavelength is in the range of 1220-1390 nm;

and wherein the output light from the last of the Raman shifting media has a wavelength of approximately 1310 nm and the light generated by the frequency-doubling optical subassembly has a wavelength of approximately 655 nm.

17. An imaging device, display or projection device comprising an optical arrangement for adjusting the wavelength of light, the optical arrangement comprising:

a first light source arranged to generate a first beam of light at a first wavelength;

a second light source arranged to generate seed light at a second wavelength;

a first Raman shifting medium arranged to receive the light from the first light source in combination with the seed light from the second light source, and to produce, by stimulated Raman scattering, output light at the second wavelength and having temporal properties determined by those of the first beam of light;

a third light source arranged to generate seed light at a third wavelength; and a second Raman shifting medium arranged to receive the output light from the first Raman shifting medium in combination with the seed light from the third light source, and to produce, by stimulated Raman scattering, output light at the third wavelength and having temporal properties determined by those of the output light from the first Raman shifting medium;

wherein the third wavelength is greater than the second wavelength, and the second wavelength is greater than the first wavelength;

wherein the frequency difference between the first beam of light and the seed light from the second light source is a frequency difference where the first Raman shifting medium exhibits Raman gain;

wherein the frequency difference between the output light from the first Raman shifting medium and the seed light from the third light source is a frequency difference where the second Raman shifting medium exhibits Raman gain; and wherein the second Raman shifting medium has a different composition from the first Raman shifting medium.

18. The imaging device according to claim 17, being a super-resolution microscope, a photoacoustic imaging device, or a flow cytometry device.

19. A method of adjusting the wavelength of light, comprising:

generating, using a first light source, a first beam of light at a first wavelength;

generating, using a second light source, seed light at a second wavelength;

arranging a first Raman shifting medium to receive the light from the first light source in combination with the seed light from the second light source, and to produce, by stimulated Raman scattering, output light at the second wavelength and having temporal properties determined by those of the first beam of light;

generating, using a third light source, seed light at a third wavelength; and arranging a second Raman shifting medium to receive the output light from the first Raman shifting medium in combination with the seed light from the third light source, and to produce, by stimulated Raman scattering, output light at the third wavelength and having temporal properties determined by those of the output light from the first Raman shifting medium;

wherein the third wavelength is greater than the second wavelength, and the second wavelength is greater than the first wavelength;

wherein the frequency difference between the first light and the seed light from the second light source is a frequency difference where the first Raman shifting medium exhibits Raman gain;

wherein the frequency difference between the output light from the first Raman shifting medium and the seed light from the third light source is a frequency difference where the second Raman shifting medium exhibits Raman gain; and wherein the second Raman shifting medium has a different composition from the first Raman shifting medium.

* * * * *